(12) United States Patent
Newman

(10) Patent No.: US 10,160,344 B2
(45) Date of Patent: Dec. 25, 2018

(54) MODULAR BATTERY ASSEMBLY

(71) Applicant: NIO NEXTEV LIMITED, Central OT (HK)

(72) Inventor: Austin L. Newman, San Jose, CA (US)

(73) Assignee: NIO NEXTEV LIMITED, Hong Kong (CN)

( * ) Notice: Subject to any disclaimer, the term of this patent is extended or adjusted under 35 U.S.C. 154(b) by 0 days.

(21) Appl. No.: 15/224,661

(22) Filed: Jul. 31, 2016

(65) Prior Publication Data

US 2017/0225588 A1 Aug. 10, 2017

Related U.S. Application Data

(60) Provisional application No. 62/293,220, filed on Feb. 9, 2016, provisional application No. 62/300,467, filed on Feb. 26, 2016.

(51) Int. Cl.
*B60R 16/04* (2006.01)
*B60L 11/18* (2006.01)
(Continued)

(52) U.S. Cl.
CPC ............ *B60L 11/1879* (2013.01); *B60K 1/04* (2013.01); *B60L 11/1822* (2013.01);
(Continued)

(58) Field of Classification Search
CPC .............. B60L 11/1879; B60L 11/1822; B60L 11/1846; B60L 11/1877; B60L 11/1851; B60L 11/18; B60L 11/1853; B60L 11/1855; B60L 11/1864; B60S 5/06; B60K 1/04; B60K 1/00; B60K 2001/0438; B60K 2001/0472; B60K 2001/0455; B60K 2001/0488; B60K 2001/0494;
(Continued)

(56) References Cited

U.S. PATENT DOCUMENTS 4,317,497 A * 3/1982 Alt ........................... B60K 1/04
180/68.5
5,501,289 A 3/1996 Nishikawa et al.
(Continued)

FOREIGN PATENT DOCUMENTS

DE 202015005208 8/2015

OTHER PUBLICATIONS

International Search Report and Written Opinion for International Patent Application No. PCT/US17/17137, dated Jun. 6, 2017, 13 pages.

(Continued)

*Primary Examiner* — James M Dolak
(74) *Attorney, Agent, or Firm* — Sheridan Ross P.C.

(57) ABSTRACT

A modular battery assembly includes at least a first battery pack and a second battery pack. Each battery pack includes a container at least partially enclosing a first plurality of electrical storage devices, an attachment mechanism configured to removably attach the first container to a chassis of a vehicle, a mechanical connector, and an electrical connector configured to connect the plurality of electrical storage devices to a control section of the vehicle. The battery pack containers are configured to be removably attached to each other by connection of the mechanical connectors.

12 Claims, 7 Drawing Sheets

(51) Int. Cl.
| | |
|---|---|
| *H01M 2/10* | (2006.01) |
| *H01M 2/20* | (2006.01) |
| *H01M 10/613* | (2014.01) |
| *H01M 10/625* | (2014.01) |
| *B60S 5/06* | (2006.01) |
| *H02J 7/00* | (2006.01) |
| *B60K 1/04* | (2006.01) |
| *H01M 10/6568* | (2014.01) |

(52) U.S. Cl.
CPC ....... *B60L 11/1846* (2013.01); *B60L 11/1877* (2013.01); *B60S 5/06* (2013.01); *H01M 2/1077* (2013.01); *H01M 2/1083* (2013.01); *H01M 2/206* (2013.01); *H01M 10/613* (2015.04); *H01M 10/625* (2015.04); *H02J 7/0027* (2013.01); *H02J 7/0045* (2013.01); B60K 2001/0438 (2013.01); B60K 2001/0472 (2013.01); B60L 2230/16 (2013.01); B60L 2230/40 (2013.01); B60Y 2200/90 (2013.01); B60Y 2306/01 (2013.01); H01M 10/6568 (2015.04); H01M 2200/00 (2013.01); H01M 2220/20 (2013.01); Y02T 10/7005 (2013.01); Y02T 10/705 (2013.01); Y02T 10/7055 (2013.01); Y02T 10/7072 (2013.01); Y02T 90/121 (2013.01); Y02T 90/124 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(58) Field of Classification Search
CPC ........... H01M 10/6557; H01M 10/625; H01M 10/613; H01M 10/00; H01M 10/65; H01M 2/206; H01M 2/1077; H01M 2/1083; H01M 2/00; H01M 2/10; H01M 2/02; H01M 2/0237; H01M 2/024; H01M 2/0245; H01M 2/0247; H01M 2/1016; H01M 2/1072; H01M 2/1088; H01M 2220/20
See application file for complete search history.

(56) References Cited

U.S. PATENT DOCUMENTS

| | | | |
|---|---|---|---|
| 7,201,384 B2 | 4/2007 | Chaney | |
| 7,507,499 B2 * | 3/2009 | Zhou | B60R 16/04 |
| | | | 429/96 |
| 7,913,788 B1 | 3/2011 | Bryer et al. | |
| 8,051,934 B2 * | 11/2011 | Kiya | B60K 1/04 |
| | | | 180/274 |
| 8,091,669 B2 * | 1/2012 | Taneda | B60K 1/04 |
| | | | 180/68.5 |
| 8,210,301 B2 | 7/2012 | Hashimoto et al. | |
| 8,322,476 B2 * | 12/2012 | Komaki | H01M 2/1077 |
| | | | 180/68.5 |
| 8,409,749 B2 * | 4/2013 | Nishino | B60K 1/04 |
| | | | 429/120 |
| 8,839,895 B2 * | 9/2014 | Kato | B60K 1/04 |
| | | | 180/68.5 |
| 9,045,030 B2 | 6/2015 | Rawlinson et al. | |
| 9,108,497 B2 * | 8/2015 | Harrison, III | B60K 1/04 |
| 9,160,042 B2 * | 10/2015 | Fujii | B60K 1/04 |
| 9,227,582 B2 * | 1/2016 | Katayama | B60K 1/04 |
| 9,321,338 B2 * | 4/2016 | Naruke | B62D 25/20 |
| 9,490,460 B2 * | 11/2016 | Yanagi | H01M 2/1083 |
| 9,630,483 B2 * | 4/2017 | Yamada | B60K 1/04 |
| 9,758,030 B2 * | 9/2017 | Newman | B60L 11/1879 |
| 10,003,052 B2 * | 6/2018 | Paramasivam | H01M 2/1083 |
| 10,003,105 B2 * | 6/2018 | Cho | H01M 10/425 |
| 10,008,708 B2 * | 6/2018 | Wu | H01M 2/206 |
| 10,020,470 B2 * | 7/2018 | Ito | A01D 34/64 |
| 10,020,476 B2 * | 7/2018 | Fan | H01M 2/1005 |
| 2003/0209375 A1 | 11/2003 | Suzuki et al. | |
| 2006/0024566 A1 * | 2/2006 | Plummer | B60R 16/04 |
| | | | 429/100 |
| 2008/0294283 A1 | 11/2008 | Ligrano | |
| 2009/0058355 A1 | 3/2009 | Meyer | |
| 2009/0078481 A1 | 3/2009 | Harris | |
| 2009/0082957 A1 | 3/2009 | Agassi et al. | |
| 2010/0009244 A1 | 1/2010 | Murata | |
| 2010/0285344 A1 * | 11/2010 | Plummer | B60R 16/04 |
| | | | 429/97 |
| 2011/0198138 A1 | 8/2011 | Sadrmajles et al. | |
| 2012/0009804 A1 | 1/2012 | Heichal et al. | |
| 2012/0312612 A1 | 12/2012 | Harrison et al. | |
| 2013/0175829 A1 | 7/2013 | Kim et al. | |
| 2013/0270864 A1 | 10/2013 | Young et al. | |
| 2014/0284125 A1 | 9/2014 | Katayama et al. | |
| 2014/0315064 A1 | 10/2014 | Katayama et al. | |
| 2014/0329125 A1 | 11/2014 | Miyanaga et al. | |
| 2014/0338998 A1 | 11/2014 | Fujii et al. | |
| 2014/0338999 A1 | 11/2014 | Fujii et al. | |
| 2015/0255764 A1 | 9/2015 | Loo et al. | |
| 2016/0068195 A1 | 3/2016 | Hentrich et al. | |
| 2016/0137229 A1 | 5/2016 | Nishida | |
| 2017/0225558 A1 | 8/2017 | Newman et al. | |

OTHER PUBLICATIONS

Notice of Allowance for U.S. Appl. No. 15/224,660, dated Apr. 26, 2017, 8 pages.
Official Action for U.S. Appl. No. 15/224,659, dated Mar. 21, 2017, 11 pages.
Official Action for U.S. Appl. No. 15/224,660, dated Jan. 26, 2017, 6 pages, Restriction Requirement.
U.S. Appl. No. 15/224,659, filed Jul. 31, 2016, Newman.
U.S. Appl. No. 15/224,660, filed Jul. 31, 2016, Newman.
U.S. Appl. No. 15/246,856, filed Aug. 25, 2016, Newman et al.
Final Action for U.S. Appl. No. 15/224,659, dated Sep. 11, 2017, 12 pages.
Official Action for U.S. Appl. No. 15/429,095, dated Oct. 26, 2017, 12 pages.

* cited by examiner

MODULAR BATTERY ASSEMBLY

PRIORITY CLAIM

This application claims priority under 35 U.S.C. § 119 to U.S. Provisional Application No. 62/293,220, filed on Feb. 9, 2016, and U.S. Provisional Application No. 62/300,467, filed on Feb. 26, 2016, both of which are expressly incorporated by reference herein in their entirety.

FIELD OF INVENTION

The present invention relates to a modular battery assembly, and, more particularly, to a modular battery assembly for an electric vehicle.

BACKGROUND

Electric vehicles have proven to be a viable alternative to gasoline-powered cars. The increasing demand for electric vehicles has placed importance on the development of the associated technology and the planning of an infrastructure that will support the many electric vehicles that will be on the roads in the future.

Most of the electric vehicles currently on the market were designed and manufactured according to a recharging-model, in which a vehicle uses the same, periodically-recharged battery pack over a long period of time. This model suffers from some drawbacks, however, because it requires car owners to allot an amount of time for recharging in which the car cannot be used. Further, planning must be made to ensure that the vehicle is near a charging station when the battery needs to be recharged. This limits the use of the vehicle to certain routes, ranges, and locations.

Vehicles designed and manufactured according to a battery replacement-model, on the other hand, allow a drained battery to be replaced with a charged battery, instead of recharged. These vehicles may overcome many of the problems associated with the recharging-model if an associated battery replacement process is otherwise faster than and more readily-available than the alternative recharging process. Moreover, a replacement-battery infrastructure may be more feasible and applicable for at least some implementation areas than it's recharging-model counterpart. In order to achieve these goals a viable design would include features that address issues such as standardization, safety, ease-of-use, and logistics. However, current battery replacement-model electric vehicles have yet to find solutions for many of the problems that arise in these areas.

When considering a large-scale implementation of a replacement battery-model, particular problems arise in determining how to render the system and infrastructure appealing and cost-effective for consumers. If the options for replacing a battery on an electric vehicle are difficult and costly, the replacement-battery model is not likely to be successful.

Some current configurations, such as those described in U.S. Patent Application Publication No. 2012/0009804 and U.S. Pat. No. 7,201,384, allow an entire battery pack to be replaced when discharged. This type of configuration has drawbacks, however, because it limits the ability of a driver to adjust the remaining charge left in their vehicle. This is problematic because a remaining charge on a vehicle may not match a user's planned amount of driving. Thus, it becomes difficult for the user to determine when to replace the battery pack.

The present disclosure is directed to overcoming one or more problems of the prior art.

SUMMARY

In one aspect, the present disclosure is directed to a modular battery assembly. The modular battery assembly includes a first battery pack and a second battery pack. The first battery pack includes a first container at least partially enclosing a first plurality of electrical storage devices, a first attachment mechanism configured to removably attach the first container to a chassis of a vehicle, a first mechanical connector, and a first electrical connector configured to connect the first plurality of electrical storage devices to a control section of the vehicle. The second battery pack includes a second container at least partially enclosing a second plurality of electrical storage devices, a second attachment mechanism configured to attach the second container to the chassis of the vehicle, a second mechanical connector, and a second electrical connector configured to connect the second plurality of electrical storage devices to the control section of the vehicle. The first container is configured to be removably attached to the second container by connection of the first and second mechanical connectors.

In another aspect the present disclosure is directed to a vehicle. The vehicle includes a body forming a passenger compartment and an exterior shell. The vehicle also includes a chassis supporting the body. The chassis includes a pair of side rails running longitudinally along the body, a pair of end rails interconnecting the side rails, and a bay defined between the side rails and the end rails. The vehicle further includes a modular battery assembly comprising a plurality of battery packs positioned in the bay and a control section. Each battery pack includes a container at least partially enclosing a plurality of electrical storage devices, an attachment mechanism removably attaching a respective battery pack to the frame structure, at least one mechanical connector removably attaching a respective battery pack to an adjacent battery pack, and an electrical connector connecting the pluralities of electrical storage devices to each other and to the control section.

In yet another aspect the present disclosure is directed to a vehicle. The vehicle includes a body forming a passenger compartment and an exterior shell. The vehicle also includes a chassis supporting the body. The chassis includes a pair of side rails running longitudinally along the body, one or more rigid cross rails interconnecting the pair of side rails, and a plurality of bays defined between the side rails and separated by the one or more cross rails. The vehicle further includes a modular battery assembly comprising a plurality of battery packs, each positioned in a separate bay of the plurality of bays, and a control section. Each battery pack includes a container at least partially enclosing a plurality of electrical storage devices, an attachment mechanism removably attaching a respective battery pack to the frame structure, at least one mechanical connector removably attaching a respective battery pack to an adjacent battery pack, and an electrical connector connecting the pluralities of electrical storage devices to each other and to the control section. Longitudinal sides of the containers each include a cutout portion, and wherein a pair of cutout portions in adjacent battery packs define a channel for receiving a cross rail of the one or more rigid cross rails.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Disclosed embodiments pertain to a modular battery system. The modular battery system includes a standardized and universal battery pack which may be secured to a vehicle to provide electrical power to that vehicle. The use of standardized connecting structures allows the battery pack to be connected to any of a number of different types and sizes of vehicles. Moreover, a plurality of the universal battery packs may be combined such that the electrical storage capacity for any given vehicle is customizable. Each battery pack includes connecting structures which allow for quick attachment and detachment to and from an adjoining battery pack. The disclosed modular battery assembly allows a variety of different vehicles to use any number of battery packs such that implementation of an associated replacement battery infrastructure and system is uncomplicated and cost-effective for consumers and service providers.

Figure 1:
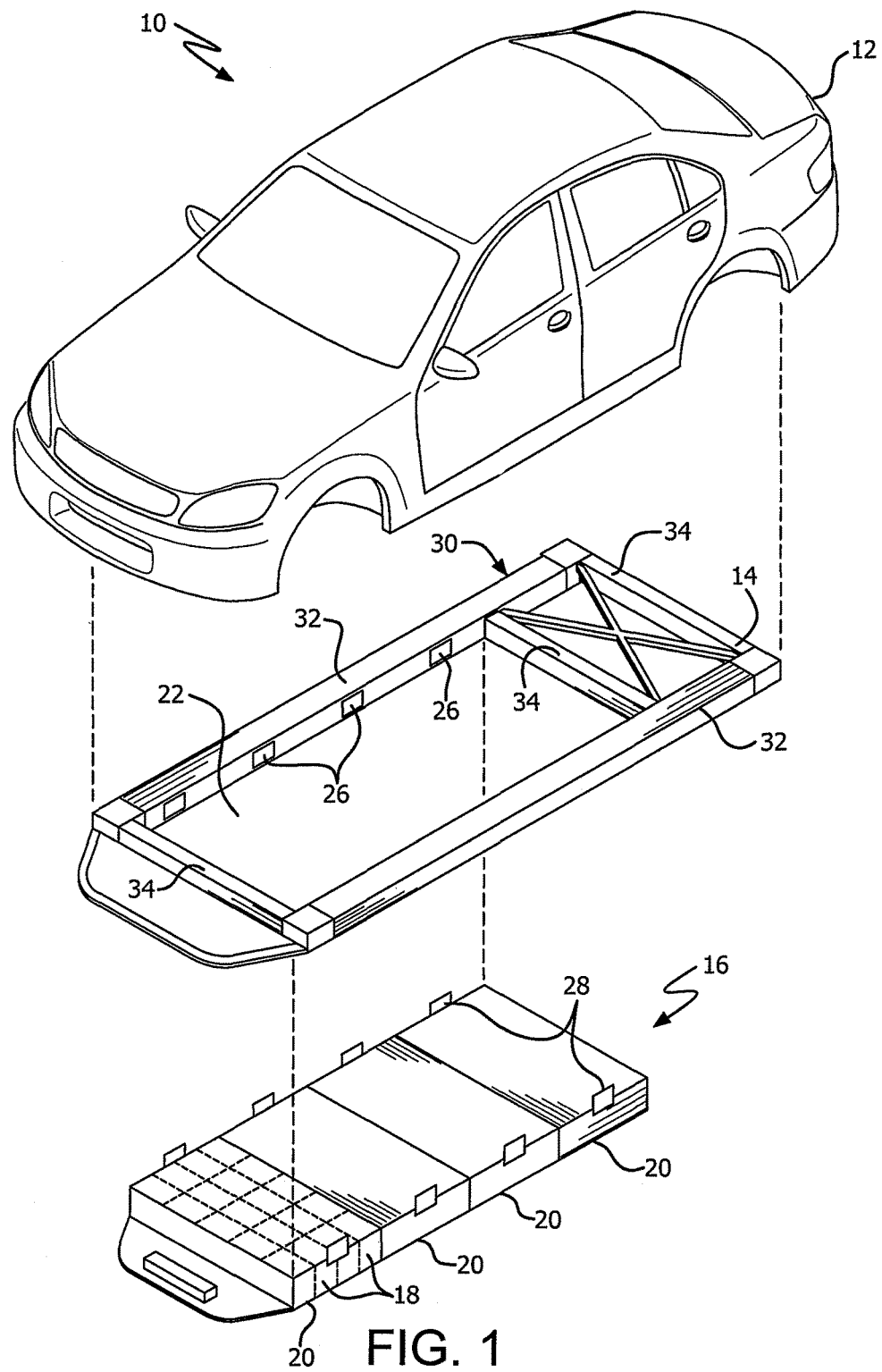
FIG. 1 is an exploded view of an exemplary vehicle.

FIG. 1 is an exploded view illustrating an exemplary vehicle 10. Vehicle 10 includes at least a body 12, a chassis 14, and a battery system 16. The body 12 includes the features and components that form the passenger compartment and exterior shell of the vehicle 10. The body 12 is supported on and by the chassis 14. The chassis 14 is a skeleton frame structure which includes, for example, a plurality of interconnected frame components, such as rigid bars, plates, fasteners, etc. The chassis 14 forms a base for supporting the body 12 and which is supported off of the ground by the wheels of the vehicle 10. The chassis 14 essentially forms a bottom portion of the vehicle 10. The battery assembly 16 is integrated into the body 12 and chassis 14 and provides electrical energy to a power system of the vehicle 10 through a plurality of electrical storage devices 18 provided in one or more battery packs 20. As shown in FIG. 1, the disclosed battery assembly 16 includes a plurality of interconnected modular battery packs 20.

Consistent with disclosed embodiments, vehicle 10 is an electric vehicle. This means that the electrical storage devices 18 provide electrical energy to a motor (not shown) for generating mechanical power to move the vehicle 10. For example, in some embodiments, vehicle 10 is an all-electric vehicle in which all or substantially all of the power generated to move vehicle 10 is provided by the electrical storage devices 18. In these embodiments, the vehicle 10 includes an engine only as a backup power source or does not include an engine. In other embodiments, vehicle 10 is a hybrid vehicle in which some of the power generated by vehicle 10 is provided by the electrical storage devices 18 and a remainder of the power is provided by an engine, such as an internal combustion engine.

It should be understood that the battery assembly 16 includes additional components which allow the electrical storage devices 18 to be utilized to provide electrical energy to a motor to power the vehicle 10. For example, the battery assembly 16 may include electrical connections (e.g., wiring, bus bars, etc.), cooling features (e.g., cooling panels), control system components (e.g., controllers, sensors, actuators, etc.), and the like, in order to allow the vehicle 10 to operate via electrical energy. At least some of these features are further described below.

As shown in FIG. 1, each battery pack 20 is generally sized and shaped to fit in a bay 22 of the chassis 14. Each battery pack 20 is movable into and out of the bay 22 in order to facilitate attachment and removal of the battery pack 20 to and from the vehicle 10. An attachment mechanism 24 releasably attaches the battery pack 20 to the chassis 14. In an exemplary embodiment, the attachment mechanism 24 includes a plurality of first attachment parts 26 on the chassis 14 and a plurality of second attachment parts 28 on each battery pack 20. The first attachment parts 26 are connectable to the second attachment parts 28 in order to secure each battery pack 20 in the bay 22.

FIG. 1 illustrates a chassis 14 which includes one large bay 22 for receiving the battery packs 20. For example, the chassis 14 includes a frame structure 30 which includes a pair of side rails 32 and a pair of end rails 34 which define the bay 22. In this embodiment, each battery pack 20 may include a rigid internal frame structure which protects the battery pack 20 from damage during a collision.

Figure 2:
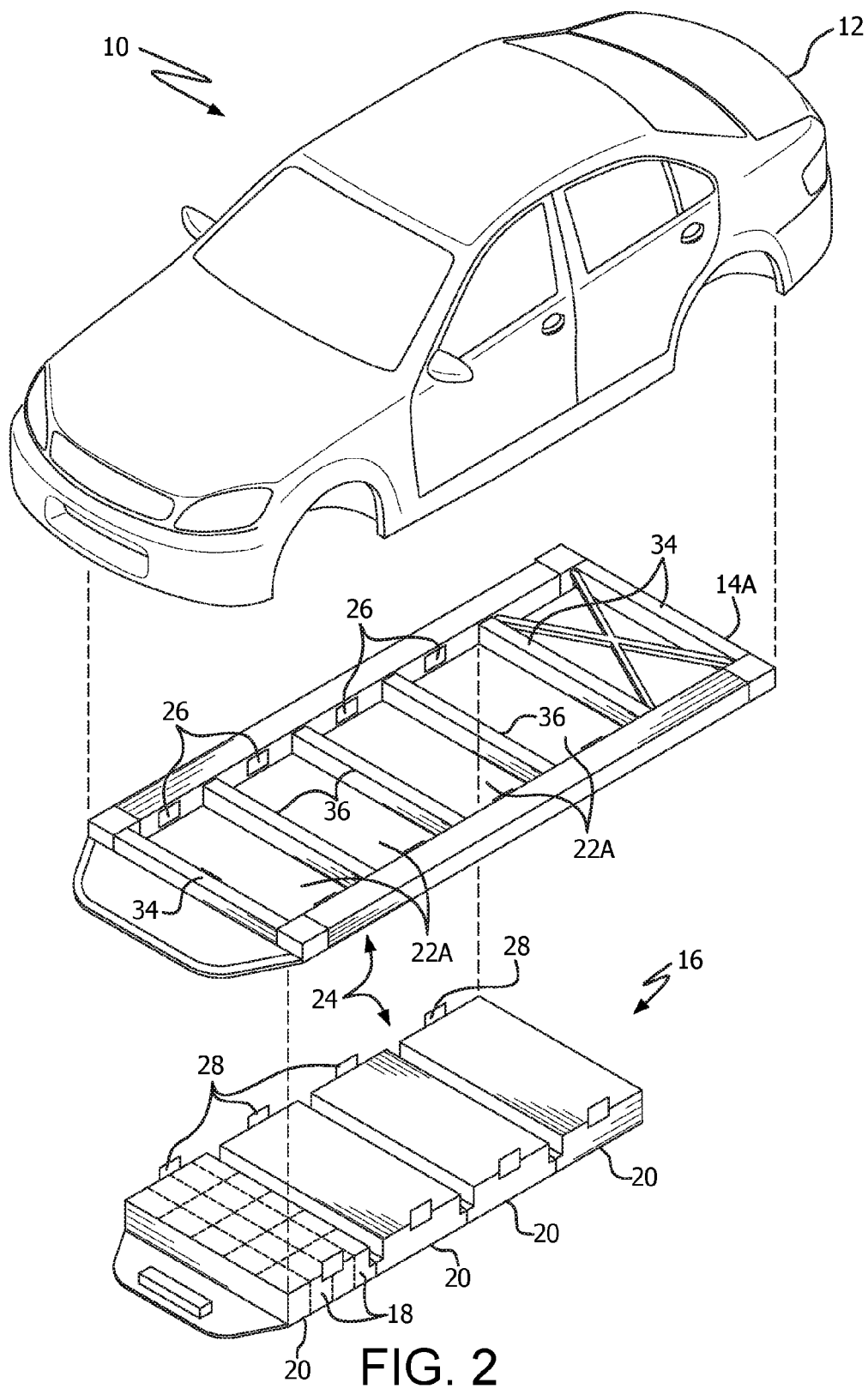
FIG. 2 is an exploded view of an exemplary vehicle according to another embodiment.

FIG. 2 illustrates an alternative embodiment including a chassis 14A which includes a plurality of cross rails 36. The plurality of cross rails 36 separate the space between the side rails 32 and end rails 34 into a plurality of bays 22A. Each bay 22A is configured to receive a battery pack 20. The plurality of cross rails 36 are rigid and provide structural integrity to the frame structure 30 in order to protect the battery packs 20 from damage during a collision. In this way, the battery packs 20 may omit an internal frame structure, resulting in a lighter and easier-to-handle component.

Figure 3:
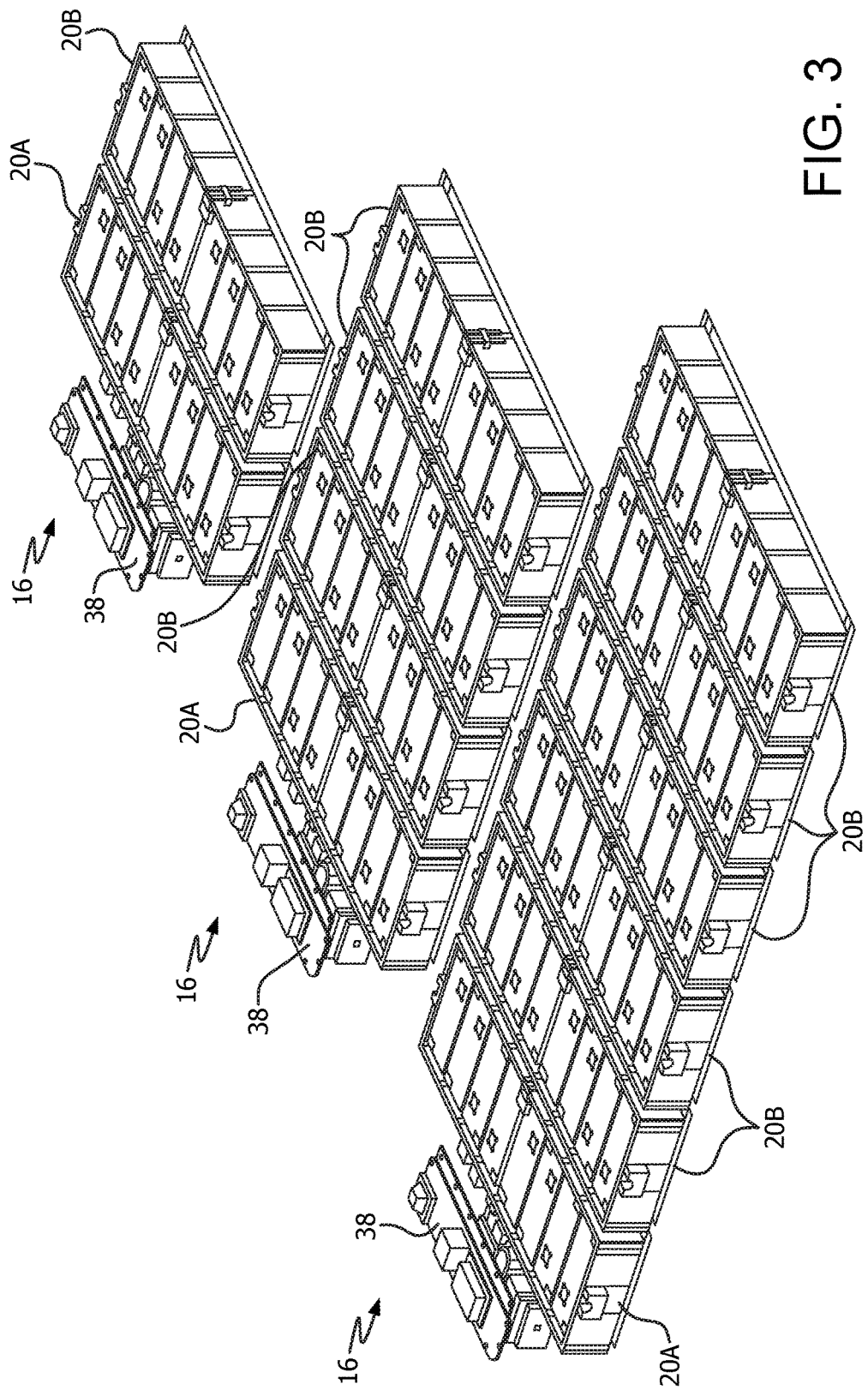
FIG. 3 is a perspective view of various battery assemblies which may be used in conjunction with the vehicle of FIG. 1.

FIG. 3 further illustrates different configurations of the battery assembly 16. The battery assembly 16, depending on the configuration, may include a different number of battery packs 20, such as two, four, or six as shown. Consistent with disclosed embodiments, the battery assembly 16 may include any number of battery packs 20 (e.g., one or more), depending on the available space and carrying ability of the vehicle 10. As shown in FIG. 3, the battery packs 20 of the battery assembly 16 are modular such that one or more can be added to extend or shorten the overall battery assembly 16.

The battery assembly 16 includes a control section 38. The control section 38 is preferably connected at one end of the battery assembly 16. The control section 38 includes components, such as control circuits, power circuits, and other electronics which control the functional aspect of using the electrical energy from the electrical storage devices 18.

A first battery pack 20A is connected to the control section 38. The remaining battery packs 20B are successively connected on the opposite end of the battery pack 20A from the control section 38. In this way, battery assembly 16 includes a linear array of transversely extending battery packs 20 (i.e., the longitudinal direction of each battery pack is positioned transverse to a longitudinal direction of the vehicle 10.

In alternative embodiments, the battery packs 20 may be arranged in other manners. For example, one or more battery packs 20 may be positioned parallel to a longitudinal direction of a vehicle. In one embodiment, a two-dimensional array of battery packs 20 may include pairs of side-by-side battery packs 20 may be stacked in a longitudinal direction of the vehicle 10.

The configurations illustrated in FIG. 3 depict how the battery assembly 16 of the disclosed embodiments is customizable in order to provide a selected number of electrical storage devices 18 to a vehicle 10. This allows for a customizable storage capacity and amount of stored electrical energy. The manner in which the battery packs 20 are electrically connected to each other will further determine the parameters of the battery assembly, as will be further described below.

Figure 4:
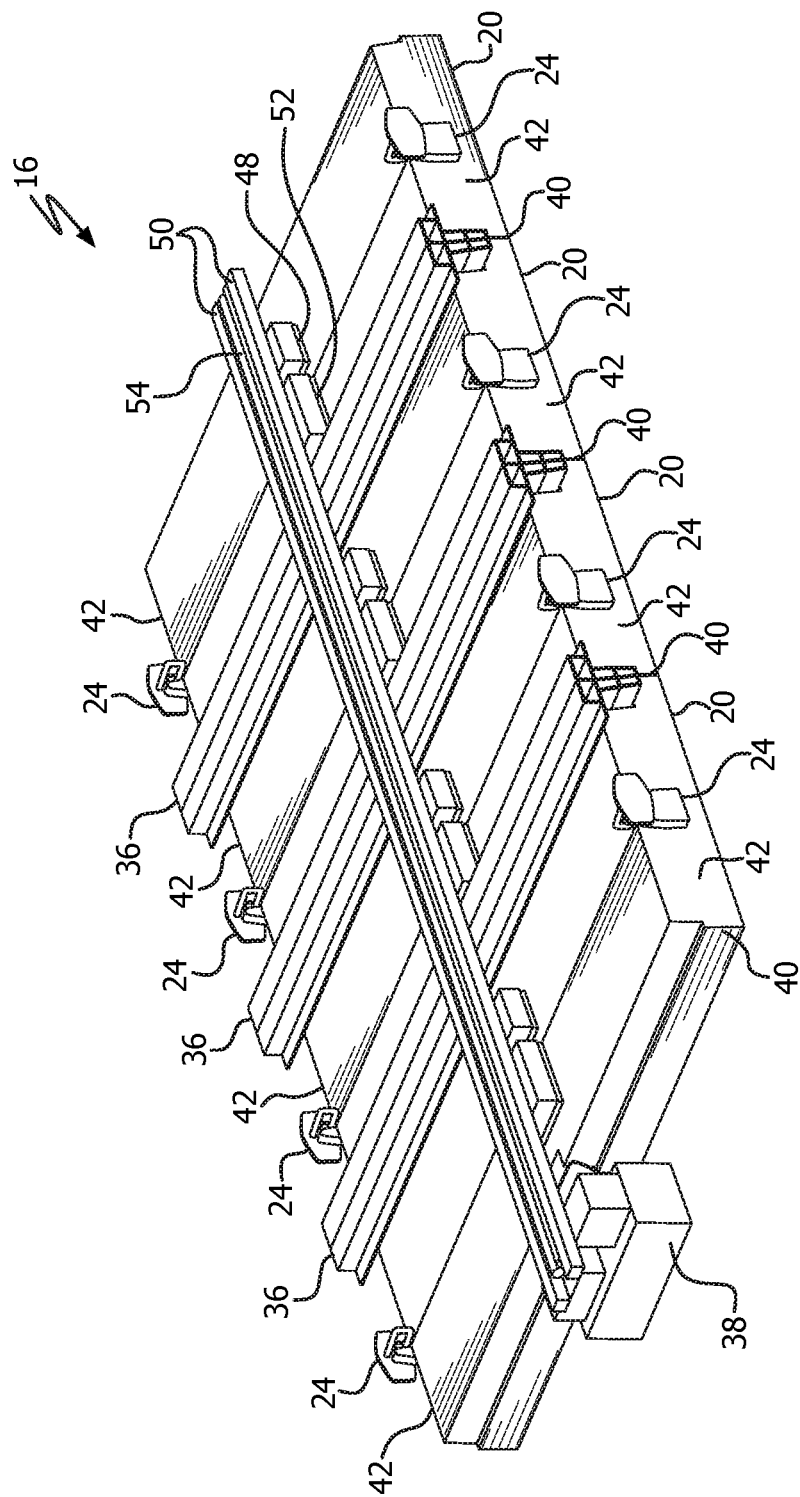
FIG. 4 is a perspective view of a battery assembly which may be used in conjunction with the vehicle of FIG. 2.
Figure 5:
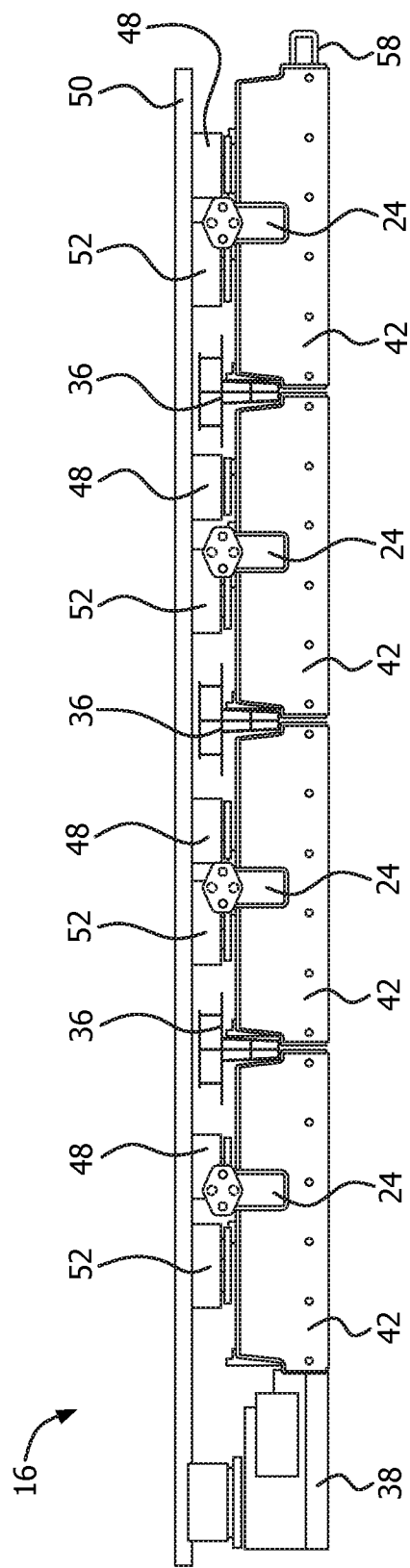
FIG. 5 is a side view of the battery pack of FIG. 4.

FIGS. 4 and 5 illustrate a perspective and side view of an exemplary battery assembly 16 respectively. In the illustrated embodiment, the battery assembly 16 includes four battery packs 20. As will be described, these battery packs 20 are formed to accommodate cross rails 36 described in relation to the chassis 14A in FIG. 2. It should be understood, however, that battery packs 20 could also be formed to be used in conjunction with the embodiment of FIG. 1, without the cross rails 36.

As shown, the battery packs 20 are consecutively positioned in relation to each other to form a linear array. Each battery pack 20 includes a pair of longitudinal sides 40 which are positioned parallel to the longitudinal sides 40 of the other battery packs 20, with at least one longitudinal side 40 of each battery pack 20 being positioned directly adjacent to a longitudinal side of the next battery pack 20. Each battery pack 20 also includes a pair of transverse ends 42. In an exemplary embodiment, the transverse ends 42 of the battery packs 20 are collinear with the corresponding transverse ends 42 of the adjoining battery packs 20. It should be understood that the terms "longitudinal" and "transverse" are terms only used as a convention to refer to the sides of the battery pack 20 and that it is not required that a longitudinal side be the longest side or the transverse end be perpendicular to the longitudinal side.

In an exemplary embodiment, each battery pack 20 includes an attachment mechanism 24 at each transverse end 42 thereof. The attachment mechanism 24 includes corresponding attachment parts 26, 28. The attachment mechanism 24 is configured to attach the battery packs 20 to the vehicle 10 in the depicted configuration. In this way, each battery pack is positioned in a separate bay 22A formed between the side rails 32 and end rails 34/cross rails 36.

In some embodiments, the corresponding attachment parts 26, 28 form a latching mechanism. The latching mechanism includes, for example, a striker positioned on the chassis 14 or the battery pack 20 and a receiving member with latching hook positioned on the other of the chassis 14 or the battery pack 20. The receiving member receives the striker and the latching hook is inserted in a portion of the striker, retaining the striker in place. The latching hook may be remotely and/or electronically controllable in order to allow for ease of attachment and detachment of each battery pack 20. For example, the latching hook may automatically attach the striker to the receiving member when the striker is in the receiving member. In some embodiments, the latching mechanism further includes a biasing seal which maintains the latching hook in a latched position. It should be understood, however, that other attachment mechanisms are possible. For example, the attachment parts 26, 28 may be fasteners, such as bolts received in aligned apertures, including single-sided fasteners, blind bolts, etc.

In a preferred embodiment, each battery pack 20 includes a mechanical connector 44 on each longitudinal side 40. Each mechanical connector 44 is configured to be connected to a mechanical connector 44 of an adjoining battery pack 20 such that the plurality of battery packs 20 are connected to each other. Alternative embodiments may not include the mechanical connectors 44 (e.g., the battery packs 20 may be connected to each other only through their attachment to the chassis 16).

In the illustrated embodiment, the adjoining battery packs 20 are connected to each other in such a way that a channel 46 is formed above attached mechanical connectors 44 of adjoining battery packs 20. Each channel 46 is configured to receive a cross rail 36. In embodiments that do not include a cross rail 36 (or in which the channel 46 is formed at another location), it is not necessary that the adjacent longitudinal sides 40 form a channel.

Each battery pack 20 also includes one or more electrical connectors 48. Each electrical connector 48 may be connected to each other and to the control section 38 such that the energy stored in the electrical storage devices 18 may be used by the vehicle 10 (e.g., provided to a motor for generating motive power). In an exemplary embodiment each electrical connector 48 includes two terminals (a positive terminal and a negative terminal) which are connected to the electrical storage devices 18 in the respective battery pack.

In an exemplary embodiment, the electrical connectors 48 are connected to each other and to the control section 38 by a pair of bus bars 50. One bus bar 50 preferably connects the positive terminals of the electrical connectors 48 and another bus bar 50 connects the negative terminals of the electrical connectors 48. In this way, the battery packs 20 are electrically connected in parallel.

Each bus bar 50 may be a high voltage connection configured to transport electrical current from the electrical storage devices 18. In addition to bus bar 50, an low voltage line 51 may be used to allow the battery packs 20 and associated controls to share data, such as data for monitoring and/or controlling the discharge of the electronic storage devices 18.

Each battery pack 20 also preferably includes a cooling connector 52 configured to connect the battery pack 20 to a flow of coolant for controlling a temperature of the electrical storage devices 18 in the associated battery pack 20. A cooling channel 54 may be formed adjacent to the bus bar 50 to provide a connecting circuit for the flow of coolant in and around the various battery packs 20.

Figure 6:
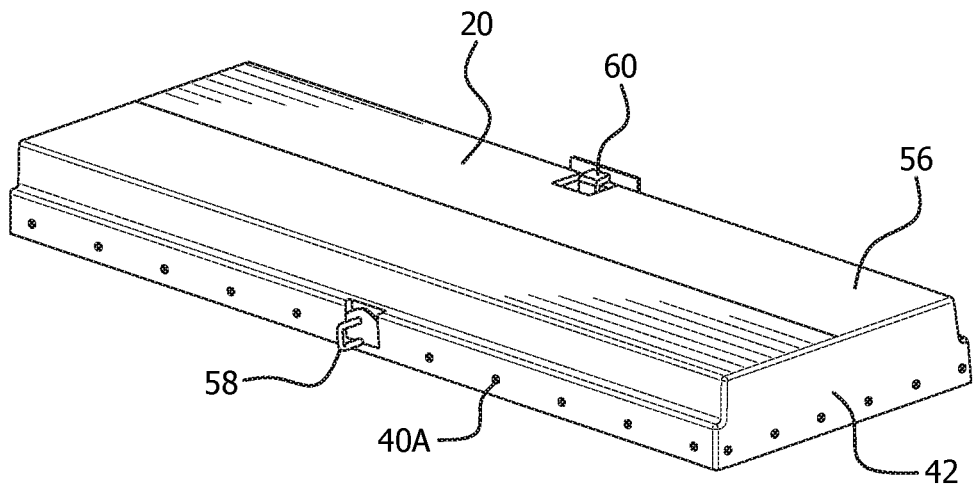
FIGS. 6-7 are perspective views of opposing sides of a battery pack.
Figure 7:
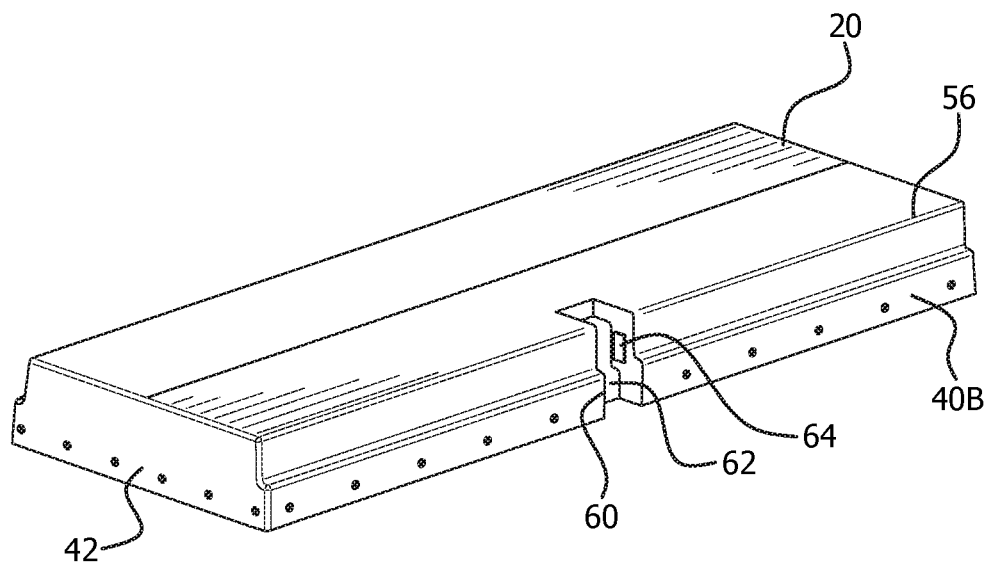

FIGS. 6 and 7 illustrate opposing sides of an exemplary battery pack 20, consistent with disclosed embodiments. The battery pack 20 preferably includes a container 56 which at least partially encloses the electrical storage devices 18. The container 56 defines the longitudinal sides 40 and the transverse ends 42.

Each of the battery packs 20 of the battery assembly 16 may include the same mechanical connectors 44 such that adjoining battery packs 20 may be attached to each other. Moreover, the mechanical connectors 44 are configured such that the connection is interchangeable such that opposing sides of adjoining battery packs 20 may be interchangeably connectable to each other. For example, one longitudinal side 40 may include a receiving member and an opposing longitudinal side 40 may include an inserting member for being inserted into the receiving member and attached thereto. In this way, the battery packs 20 are universal and standardized such that the battery assembly 16 can be extended and shortened through the linking of battery packs 20.

In an exemplary embodiment, a first longitudinal side 40A includes a striker 58 as a first mechanical connector 44 and a second longitudinal side 40B includes a receiving member 60 with a slot 62 for receiving the striker 58 of another battery pack 20. The receiving member 60 further includes a latching hook 64 for being inserted in the striker 58 in order to secure the two battery packs 20 to each other.

Figure 8:
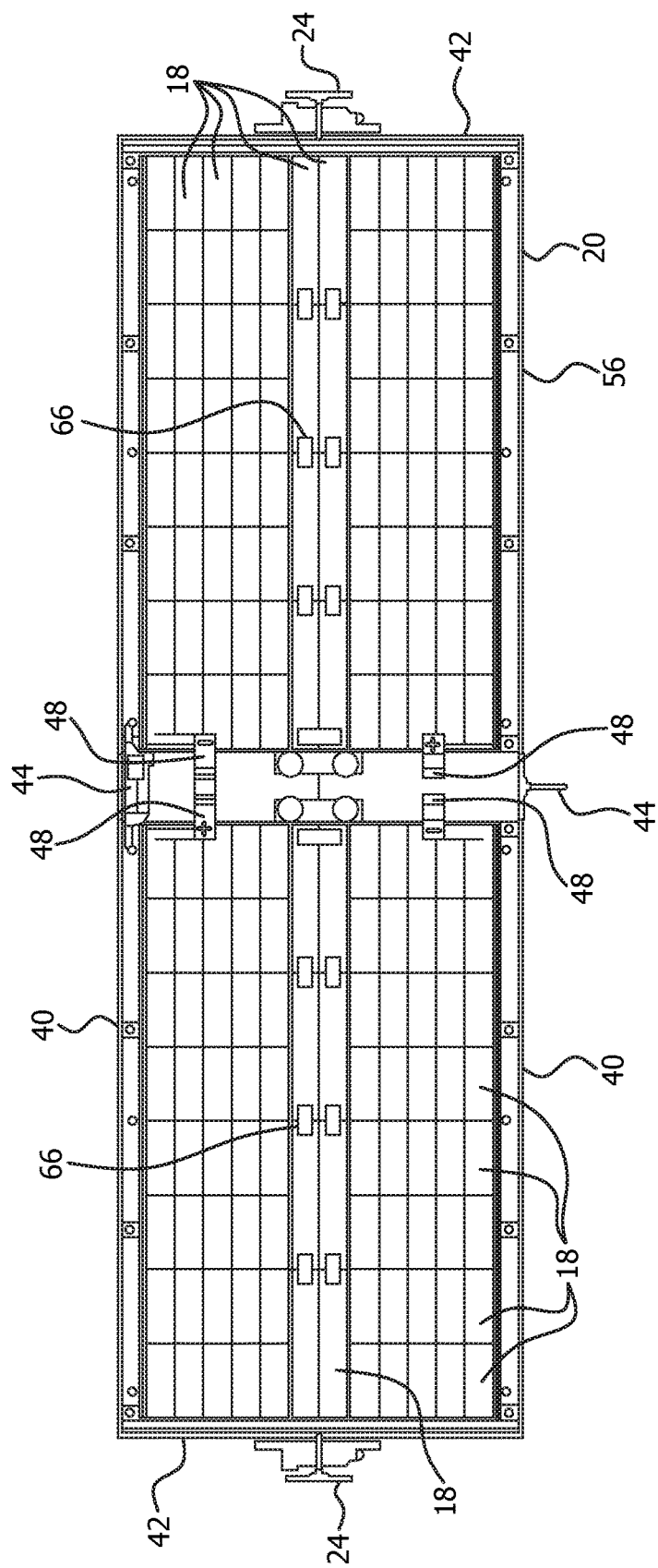
FIG. 8 is a top view of a pair of connected battery packs.

FIG. 8 illustrates a top view of a pair of connected battery packs 20, with a top portion removed in order to show the electrical storage devices 18. In an exemplary embodiment, each battery pack 20 includes a plurality of storage device blocks 66. The storage device blocks 66 each include a plurality of electrical storage devices 18. The electrical storage devices 18 and the storage device blocks 66 are connected, in a manner known in the art, in order to provide a battery pack 20 having a defined voltage and capacity rating (e.g., in amp hours).

In an exemplary embodiment, the battery packs 20 are connected to each other in parallel (e.g., via electrical connectors 48 and bus bars 50). In other words, the electrical storage devices 18 of one battery pack 20 are electrically connected to the electrical storage devices 18 of each other battery pack 20 in parallel. This may be achieved by connecting negative terminals of each battery pack 20 to each other and positive terminals of each battery pack 20 to each other, for example.

By virtue of being connected in parallel, the capacity rating of the sum of the two battery packs 20 is double that of just one of the battery packs 20. On the other hand, the voltage of the combined pair is the same as a single battery pack 20. In this way, the addition of battery packs 20 to a battery assembly 16 of a vehicle 10 adds additional capacity rating (additional amp hours), which provides additional range (time-in-use) to the vehicle 10. The range of the vehicle 10 is thus customizable based on the number of battery packs 20 attached thereto. In an exemplary embodiment, each battery pack 20 provides 40-60 amp hours of electrical charge/range.

As this type of connection does not increase voltage, the power and speed dynamics of the vehicle will remain relatively unchanged regardless of the number of battery packs 20 added to the vehicle 10. Each battery pack 20 is preferably configured to produce sufficient voltage to adequately power an associated motor of the vehicle 10 (e.g., to allow the vehicle 10 to reach highways speeds, travel uphill, etc.). In an exemplary embodiment, each battery pack 20 supplies a voltage of approximately 350-400 V (which is thus also the combined voltage provided by all of the battery packs 20).

The disclosed modular battery assembly provides a system for an electric vehicle which allows for the removable attachment of modular battery packs to thereby customize the electrical storage capacity of the vehicle. Each battery pack includes a plurality of electrical storage devices and the battery packs are electrically connected in parallel. Thus, adding an additional battery pack adds range and removing a battery pack removes range. In this way, a driver may customize the amount of electrical charge in a vehicle to more closely match a planned amount of driving.

The disclosed modular battery assembly further includes mechanisms which removably attach each battery pack to a chassis of the vehicle and to each other. The mechanisms further include electrical connections which facilitate the interconnection of the electrical storage devices for providing electrical energy to a motor of the vehicle and electronic control over the battery packs. The attachment mechanisms thereby contribute to the ability to customize the electrical storage capacity of the vehicle. Moreover, the frame and battery packs use connections that create a standardized and universal system that a variety of vehicles may be manufactured and/or adapted to use.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A modular battery assembly, comprising:
   a first battery pack comprising:
     a first container at least partially enclosing a first plurality of electrical storage devices;
     a first attachment mechanism to removably attach the first container to a chassis of a vehicle;
     a first mechanical connector; and
     a first electrical connector to connect the first plurality of electrical storage devices to a control section of the vehicle; and
   a second battery pack comprising:
     a second container at least partially enclosing a second plurality of electrical storage devices;
     a second attachment mechanism to attach the second container to the chassis of the vehicle;
     a second mechanical connector; and
     a second electrical connector to connect the second plurality of electrical storage devices to the control section of the vehicle,
   wherein the first and second containers each include a pair of longitudinal sidewalls and a pair of transverse endwalls which define a perimeter thereof,
   wherein the first mechanical connector is on a first longitudinal sidewall of the pair of longitudinal sidewalls of the first container,
   wherein the second mechanical connector is on a first longitudinal sidewall of the pair of longitudinal sidewalls of the second container,
   wherein the first container is removably attached to the second container by connection of the first and second mechanical connectors,
   wherein the first longitudinal sidewall of the second battery pack includes a slot,
   wherein the second mechanical connector is located in the slot, and
   wherein the first mechanical connector protrudes from the first longitudinal sidewall of the first container into the slot and connects with the second mechanical connector to secure the first container to the second container.

2. The modular battery assembly of claim 1, wherein the pairs of longitudinal sidewalls are longer than the pairs of transverse end walls, and wherein the first longitudinal sidewall of the first container and the first longitudinal sidewall of the second container each have cutout portions such that when the first container and the second container are connected to one another stepped surfaces create a channel that accommodates a cross rail of the chassis of the vehicle.

3. The modular battery assembly of claim 1, wherein the first attachment mechanism and the second attachment mechanism are secured to the transverse endwalls of the first and second containers, wherein the first mechanical connector is located closer to a first edge of the first longitudinal sidewall than a second edge of the first longitudinal sidewall that is opposite the first edge.

4. The modular battery assembly of claim 3, wherein the first attachment mechanism and the second attachment mechanism each include a pair of receiving members to receive a striker attached to the chassis of the vehicle, each receiving member including a latching hook for automatically attaching the striker to the receiving member when the striker is in the receiving member.

5. The modular battery assembly of claim 1, wherein the slot penetrates the first longitudinal sidewall from a first surface of the second container to a second surface of the second container that is opposite the first surface.

6. The modular battery assembly of claim 5, wherein the first mechanical connector is a striker and the second mechanical connector is a receiving member including a latching hook for automatically attaching the striker to the receiving member when the striker is in the receiving member.

7. The modular battery assembly of claim 1, wherein the second battery pack further includes an opposing second mechanical connector on a second longitudinal sidewall of the second container, the opposing second mechanical connector configured to secure the second container to a third battery pack.

8. The modular battery assembly of claim 7, further comprising:
the third battery pack comprising:
a third container at least partially enclosing a third plurality of electrical storage devices;
a third attachment mechanism to removably attach the third container to the chassis of the vehicle;
a third mechanical connector; and
a third electrical connector to connect the third plurality of electrical storage devices to the control section of the vehicle,
wherein the third container is removably attached to the second container by connection of the third and opposing second mechanical connectors.

9. The modular battery assembly of claim 8, wherein the opposing second mechanical connector is inserted into the third mechanical connector to secure the second container to the third container.

10. The modular battery assembly of claim 8, wherein the first mechanical connector is interchangeably connectable to the second mechanical connector and the third mechanical connector.

11. The modular battery assembly of claim 1, wherein the first longitudinal sidewalls of the first and second containers include a cutout portion, and wherein a pair of cutout portions define a channel for receiving a cross rail when the first container is adjacent to the second container.

12. The modular battery assembly of claim 1, further including a bus bar connecting the first electrical connector to the second electrical connector, the bus bar connecting the first plurality of electrical storage devices and the second electrical storage devices to each other in parallel.

\* \* \* \* \*